United States Patent
Bareis et al.

(10) Patent No.: US 7,735,315 B2
(45) Date of Patent: Jun. 15, 2010

(54) DEVICE AND METHOD FOR PRODUCING AN OPERATING MEDIUM FOR A MOTOR VEHICLE

(75) Inventors: Marc Bareis, Markgroeningen (DE); Frank Ilgner, Stuttgart (DE); Horst Harndorf, Schauenburg (DE); Nils Steinbach, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 112 days.

(21) Appl. No.: 11/577,630

(22) PCT Filed: Sep. 8, 2005

(86) PCT No.: PCT/EP2005/054459

§ 371 (c)(1),
(2), (4) Date: Apr. 20, 2007

(87) PCT Pub. No.: WO2006/045669

PCT Pub. Date: May 4, 2006

(65) Prior Publication Data

US 2008/0092532 A1    Apr. 24, 2008

(30) Foreign Application Priority Data

Oct. 26, 2004 (DE) .................. 10 2004 051 905

(51) Int. Cl.
*F01N 3/10* (2006.01)

(52) U.S. Cl. ............... 60/303; 60/286; 60/289; 60/295; 60/300; 60/301; 431/158; 431/233; 431/258

(58) Field of Classification Search ............ 60/274, 60/286, 289, 293, 295, 297, 300, 301, 303; 431/5, 158, 233, 258, 350, 353
See application file for complete search history.

(56) References Cited

U.S. PATENT DOCUMENTS

| 4,383,411 A | * | 5/1983 | Riddel | 60/303 |
| 4,576,617 A | * | 3/1986 | Renevot | 95/279 |
| 4,858,432 A |   | 8/1989 | Knauer et al. | |
| 4,912,920 A | * | 4/1990 | Hirabayashi | 60/303 |
| 5,277,025 A | * | 1/1994 | Gonze et al. | 60/274 |
| 5,320,523 A | * | 6/1994 | Stark | 431/353 |
| 5,441,401 A | * | 8/1995 | Yamaguro et al. | 431/4 |

(Continued)

FOREIGN PATENT DOCUMENTS

DE    43 15 278 A1    11/1994

(Continued)

*Primary Examiner*—Binh Q Tran
(74) *Attorney, Agent, or Firm*—Ronald E. Greigg

(57) ABSTRACT

The invention relates to a device and a method for producing an operating medium for a motor vehicle, especially for use in the exhaust gas post-treatment of the motor vehicle. According to said method, an operating medium is produced from an initial product and air using a catalyst device. Said initial product is heated and mixed with air and the heated mixture of initial product/air is fed to the catalyst device. A part of the initial product is converted to the gaseous phase by means of a preheating element and is entrained by a stream of air when leaving the preheating element, said stream of air leading to a combustion chamber. The method allows to efficiently produce an operating medium, especially a reducing agent for regenerating $NO_x$ storage catalysts.

15 Claims, 1 Drawing Sheet

U.S. PATENT DOCUMENTS

| | | |
|---|---|---|
| 5,628,186 A | 5/1997 | Schmelz |
| 5,722,588 A * | 3/1998 | Inoue et al. ............. 237/12.3 C |
| 7,032,376 B1 * | 4/2006 | Webb et al. .................. 60/297 |

FOREIGN PATENT DOCUMENTS

| | | |
|---|---|---|
| EP | 0 309 723 A1 | 4/1989 |
| EP | 1 369 557 A1 | 12/2003 |
| WO | WO 03/091551 A1 | 11/2003 |

* cited by examiner

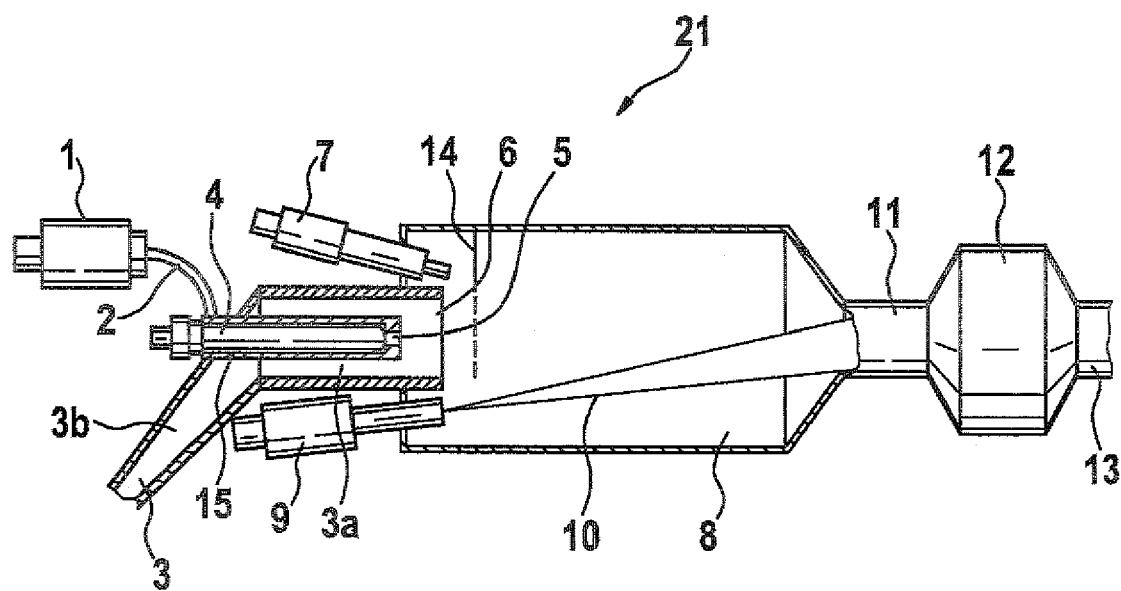

DEVICE AND METHOD FOR PRODUCING AN OPERATING MEDIUM FOR A MOTOR VEHICLE

CROSS-REFERENCE TO RELATED APPLICATION

This application is a 35 USC 371 application of PCT/EP 2005/054459 filed on Sep. 8, 2005.

BACKGROUND OF THE INVENTION

1. Field of the Invention

The invention is directed to an improved device and a method for producing a medium for the treatment of exhaust gases from an internal combustion engine.

2. Description of the Prior Art

In Otto and diesel engines, exhaust gas cleaning is gaining ever-increasing significance. In the superstoichiometric exhaust gas, that is, in lean operation of an Otto engine or in the operation of a diesel engine, the nitrogen oxides that occur in combustion cannot be adequately decomposed, because of the oxygen excess. Therefore, even in diesel vehicles, extensive exhaust gas posttreatment with regard to particle emissions and $NO_x$ emissions is necessary. To reduce $NO_x$ emissions, the $NO_x$ storage-type catalytic converters are attractive. They store nitrogen oxides even under superstoichiometric conditions. As the quantity of stored nitrogen oxides increases, the storage capacity decreases, so that the storage-type catalytic converter must be cleaned out again or regenerated at regular intervals. This is possible only in a reducing environment; that is, rich exhaust gas conditions (lambda value <1) must first be established. From German Patent Disclosure DE 100 62 956, it is also known to generate a reducing agent on board the motor vehicle, outside the exhaust gas line of the internal combustion engine of a motor vehicle, and to supply it downstream of the engine to the exhaust gas before entry into a $deNO_x$ catalytic converter.

SUMMARY AND ADVANTAGES OF THE INVENTION

The device and method of the invention for producing an operating medium have the advantage over the prior art of furnishing an operating medium as needed and dynamically, in particular a synthetic gas, with fast starting times and tailored response capability. Compared to the quantity of operating media that are typically generated, the dieseling volume is small, so that in addition to as-needed furnishing within short times, inaccurate dosages and thus overly high consumption of operating media and overly high environmental burdens are avoided. The system according to the invention can be employed in manifold ways, in particular for furnishing synthetic gas with high proportions of hydrogen and carbon monoxide to regenerate $NO_x$ storage-type catalytic converters. Moreover, the system can be used to regenerate and desulfatize soot particle filters. Besides these applications in diesel-engine exhaust gas posttreatment, a synthetic gas furnished by means of the device of the invention can also be used for improved engine performance with regard to cold starting and mixed operation; that is, it can be added to the fuel that the engine uses to drive the motor vehicle. Moreover, hydrogen generated by means of the device of the invention can also serve as fuel in mobile fuel cell systems.

By means of the provisions disclosed, advantageous refinements of and improvements to the devices and methods are possible. It is especially advantageous that a combustion chamber is disposed outside the exhaust gas line of the motor vehicle, so that defined air conditions can be established in the chamber.

It is also advantageous to embody the air supply line in such a way that the air flow is subjected to a swirl. By means of an air supply system disposed obliquely or at a right angle to the orifice of the air supply line in the combustion chamber, fast, thorough mixing of the heated initial product with delivered air is attained.

Advantageously, a preheating element is embodied as a glow plug, which is already present as a standard component and efficiently furnishes a relatively small chamber, in particular an annular gap, that can be flushed with initial product, so that first, fast heating of small volumes can be accomplished, and second, a dieseling volume upon shutoff of the system can be kept small, in comparison to the total initial product converted by the device.

By means of an ignition element, especially a spark plug, the heated initial product, already mixed with delivered air, can advantageously be ignited in a way that assures self-maintained combustion.

The initial product delivered in this way via a separate initial product delivery unit is well-heated by means of the small volume of heated and then combusted initial product, in particular by the resultant products of combustion or combustion gases, and at the same time is well mixed with the delivered air, so that a warm or hot mixture of initial product and air is generated in the combustion chamber and can be used efficiently, for instance in a reformer catalytic converter, for partial oxidation to generate a reducing agent, which in a further step can be used in the exhaust gas line of an internal combustion engine to regenerate an $NO_x$ storage-type catalytic converter.

BRIEF DESCRIPTION OF THE DRAWING

One exemplary embodiment of the invention is described in further detail herein below, with the reference to the single drawing FIGURE which shows a burner construction according to the invention for performing the method of the invention.

DESCRIPTION OF THE PREFERRED EMBODIMENTS

The drawing FIGURE shows a device 21 for producing an operating medium, especially a reducing agent for exhaust gas posttreatment of motor vehicles equipped with an internal combustion engine. The reducing agent can be drawn at the outlet 13 of the device and delivered to an exhaust gas line of the engine. The device has a combustion chamber 8, into which an air supply line 3 discharges. The air supply line 3 has a swirl chamber 3a, protruding into the combustion chamber 8, and a connection line 3b adjoining it on the side of the swirl chamber 3a remote from the combustion chamber. The connection line 3b is disposed at an angle other than zero relative to the swirl chamber 3a, so that air delivered via the connection line 3b, on emerging from the swirl chamber into the combustion chamber 8 is provided with a swirl, or in other words develops a nonlaminar or nonhomogeneous air flow. Inside the swirl chamber 3a, there is a preheating element in the form of an electric heater, embodied as a glow plug 4. The glow plug 4 extends along a longitudinal axis of the swirl chamber 3a; one end of the elongated glow plug is oriented toward the combustion chamber but is located inside the swirl chamber 3a. The end of the glow plug 4 remote from the combustion chamber 8 protrudes, sealed off from the air supply line 3, from the air supply line 3; the glow plug is surrounded by a housing adapted to the shape of the glow plug, in order to form an annular gap 15 that in particular can be filled with a liquid. This annular gap 15 can be subjected in metered fashion to fuel via an injection valve 1 communicating with a fuel line 2. On the side of the glow plug oriented toward the combustion chamber, the annular gap 15 opens into an outlet opening 5, which establishes a communication with the combustion chamber 8 via an inner region, oriented toward the combustion chamber, of the swirl chamber 3a. Adjacent to the outlet opening 6 of the swirl chamber, there is an electric spark plug 7. Both the spark plug 7 and the outlet opening 6 of the swirl chamber are oriented with a flame stabilizer in the form of a metal net flame holder 14; the metal net 14 is disposed in the combustion chamber 8 such that it is spaced apart from both the outlet opening 6 and the spark plug 7. The outlet opening 11 of the combustion chamber is located on the side of the combustion chamber 8 diametrically opposite the outlet opening 6 of the swirl chamber and the spark plug 7. A second injection valve 9 protrudes with its opening into the combustion chamber 8 on the side where the spark plug 7 and the swirl chamber 3a also protrude into the combustion chamber. The injection valve 9 is aligned with the outlet opening 11 of the combustion chamber, so that when the injection valve 9 is open, a fuel spray 10 aimed at the outlet opening 11 can develop. Downstream of the outlet opening 11 of the combustion chamber is a catalytic converter 12, in the form of a reformer catalytic converter for partial oxidation, from whose outlet 13 the desired reducing agent can in turn be drawn.

Besides hydrocarbons, or in other words in particular Otto and diesel fuel, hydrogen and/or carbon monoxide can be employed as reducing agents in the regeneration of $NO_x$ storage-type catalytic converters. The use of such a synthetic gas comprising hydrogen or carbon monoxide, or a mixture of the two, leads to more-efficient reduction at lower catalytic converter temperatures, in comparison to the use of hydrocarbons. The regeneration of an $NO_x$ storage-type catalytic converter can be shifted to temperatures in the range of from 200° C. to 150° C. To avoid having to fill the motor vehicle tank with hydrogen or carbon monoxide from other operating media and to carry the necessary compressed gas or liquid reservoirs along, the synthetic gas can be generated from liquid hydrocarbons, especially Otto and diesel fuel, directly in the vehicle by means of the device of the invention, using a so-called reforming process (known as "CPOX", the abbreviation for "Catalytic Partial Oxidation"). The system with an integrated burner is distinguished by fast starting times, in the range of less ten seconds, and high dynamics in as-needed furnishing of the hydrogen/carbon monoxide mixture. In the catalytically supported reformation process, air and fuel are converted under substoichiometric conditions, or in other words at a lambda value in the range in particular between 0.3 and 0.45, to a hydrogen- and carbon-monoxide-rich synthetic gas. To that end, the educt mixture entering the reformer catalytic converter 12 for partial oxidation must be prepared with regard to temperature and homogeneous thorough mixing. The fuel, furnished at approximately 2 to 3 bar from a vehicle tank, via a conventional electric fuel pump, not shown in detail, and a pressure holding valve, is delivered as needed to the burner via the low-pressure injection valve 1. To achieve stable combustion with low emissions, the fuel is evaporated in the burner by means of the glow plug 4. To avoid pulsation in the burner that can lead to extinguishing of the flame and increased emissions, the valve is preferably operated at timing frequencies above 30 Hz. The metered fuel flows via the fuel line 2, embodied as a small tube, into the annular gap 15 and evaporates on the hot surface of the glow plug. Because of the small cross-sectional area of the small tube 2, the injection valve 1 is thermally decoupled from the hot evaporator region. The pulsation of the required combustion air is done via the air supply line 3, which can be subjected to air via an electromagnetically actuatable valve not show in further detail, a throttle restriction, or some other suitable method; the air can be drawn from a pressure reservoir as a function of the counterpressure of the exhaust gas at approximately 0.2 bar (in idling) to 1.5 bar (at full load, especially if the diesel particle filter is already full). The filling of the air reservoir, which is not shown further, is done via a compressor or the turbocharger present in the vehicle, since because of the comparatively high counterpart exhaust gas pressures of up to 500 mbar in the vehicle, conventional blowers do not suffice to furnish the required pilot pressure for metering the air. The burner air is delivered at a tangent to the evaporator or burner via the swirl chamber 3a. The mixing of the air with the evaporated fuel (fuel as the initial product) is thus reinforced. The imposed swirl, by forming recirculation zones, further favors complete combustion and the stabilization of the flame inside the combustion chamber 8. For ignition of the mixture of evaporated fuel, delivered via the injection valve 1, and the air as the mixture enters the combustion chamber 8, either two ignition electrodes or the conventional spark plug 7 is used, by means of which electrodes or spark plug an arc is generated via high electrical voltage. The ignition is necessary here only upon starting of the burner, since the flame maintains itself. This is possible because the combustion chamber 8 is in a defined state with defined gas flows, or in other words is not located inside an exhaust gas line of the motor vehicle, in which stable flame operation cannot be assured, given the variation gas pressures and different gas compositions. Moreover, the air swirl promotes good mixing and thus efficient combustion. The flame holder 14 furthermore stabilizes combustion, once induced, of the fuel delivered via the injection valve 1 and evaporated by means of the glow plug 4. In the region of the outlet opening 6 from the swirl chamber and the spark plug 7, superstoichiometric conditions prevail (lambda value between 1.1 and 1.2), so that the fuel delivered via the injection valve 1 can be combusted completely. In burner operation in the region of the spark plug, upon combustion of the fuel from the injection valve 1, combustion conversions are attained that lead to a thermal output in the range between 0.5 and 3 kilowatts. Following the combustion, fuel is added as an initial product for the reformer catalytic converter 12 via the second low-pressure injection valve 9. Because of the high impetus of the fuel emerging from the nozzle opening of the injection valve 9, the fuel can be delivered through the combustion chamber 8 to the catalytic reformation process in the catalytic converter 12 without restricting the stability of the burner. The fuel, introduced in liquid form, from the injection valve 9 is evaporated quickly and completely in the hot burner exhaust gas, so that damage to the catalytic converter 12 from the occurrence of fuel droplets can be avoided. In the combustion chamber 8, the fuel delivered via the second injection valve 9 is evaporated completely, but only partially oxidized at most. If a reformer catalytic converter of this kind is used for partial oxidation, a large amount of hydrogen and carbon monoxide occurs. These molecules are to be preferred, despite their lesser reduction potential compared with liquid hydrocarbons, since because of their small size in comparison to long-chained hydrocarbons they are more-reactive and offer the advantage of not sooting up an $NO_x$ storage-type catalytic converter that has to be regenerated.

In an alternative embodiment, however, a cracking catalytic converter can also be employed. A cracking catalytic converter chops up long-chained hydrocarbon molecules into short molecule chains, which can likewise be used as reducing agents to regenerate $NO_x$ storage-type catalytic converters, although with the disadvantage of partial sooting up of downstream exhaust gas devices. Besides the regeneration of $NO_x$ storage-type catalytic converters or diesel particle filters, operating medium emerging via the outlet 13 can also be used in mobile fuel cell systems, in supplementary heaters for passenger cars, such as standby heaters and for reducing emissions in cold starting of vehicles. By mixing hydrogen and carbon monoxide in with the liquid fuel upstream of the engine, the combustion process in the engine can be favorably affected. Crude emissions are produced in a smaller quantity and cannot clog the still-cold exhaust gas catalytic converter. For this purpose, the starting times of the system must be very short, since a majority of the emissions is produced upon starting in approximately the first 30 seconds. In a further alternative embodiment, a second air delivery may be provided in the region of the outlet opening 11 from the combustion chamber, or in a region between the combustion chamber 8 and the catalytic converter 12, in order to deliver oxygen for the partial oxidation of the fuel metered by means of the injection valve 9.

The foregoing relates to a preferred exemplary embodiment of the invention, it being understood that other variants and embodiments thereof are possible within the spirit and scope of the invention, the latter being defined by the appended claims.

The invention claimed is:

1. A device for producing an operating medium for delivery to an exhaust gas line of an internal combustion engine for posttreatment of exhaust gas in the exhaust gas line, the device comprising:
   a catalytic converter having an inlet and an outlet for connection to the exhaust gas line; a first chamber connected to the inlet of the catalytic converter;
   means for supplying initial product to the first chamber; and
   means for supplying heated air to the first chamber to rapidly evaporate the initial product supplied to the first chamber, said means for supplying heated air to the first chamber including a second chamber having an outlet discharging into the first chamber, an air supply line discharging air into the second chamber, means for supplying evaporated initial product to the second chamber including a preheating element disposed within the second chamber for evaporating the initial product supplied to the second chamber, and means located in the first chamber for igniting the evaporated initial product supplied to the second chamber in order to heat the air supplied to the second chamber.

2. The device as defined by claim 1, wherein the first chamber is disposed outside an exhaust gas line of the motor vehicle.

3. The device as defined by claim 1, wherein the second chamber subjects the air flow to a swirl.

4. The device as defined by claim 1, wherein the air supply line is supplied with compressed air in a pressure range from approximately 0.2 to 1.5 bar.

5. The device as defined by claim 4, wherein the compressed air is compressed ambient air and/or compressed exhaust gas diverted from the exhaust gas line of the internal combustion engine.

6. The device as defined by claim 1, further comprising a metal net flame stabilizer disposed in the first chamber in spaced relation to the outlet of the second chamber.

7. The device as defined by claim 1, wherein the preheating element comprises a glow plug.

8. The device as defined by claim 7, further comprising an annular gap formed around the glow plug, and wherein the initial product is discharged into the annular gap for flushing the glow plug with the initial product.

9. The device as defined by claim 1, further comprising an injection valve operable to effect the supply of the initial product to the first chamber.

10. The device as defined by claim 1, wherein the first chamber acts as a means for generating an initial product-air mixture, and wherein the means for supplying initial product to the first chamber comprises an injection valve which discharges into the first chamber.

11. The device as defined by claim 1, wherein the means located in the first chamber for igniting the evaporated initial product comprises an ignition element in the form of a spark plug or two ignition electrodes.

12. The device as defined by claim 11, wherein the ignition element is disposed in the region of the outlet of the second chamber at which the air supply line discharges into the first chamber.

13. The device as defined by claim 10, wherein the inlet of the catalytic converter is disposed diametrically opposite the outlet of the second chamber.

14. The device as defined by claim 1, wherein the internal combustion engine is the engine of a motor vehicle, and the initial product is fuel with which the engine can be operated.

15. The device as defined by claim 1, wherein the catalytic converter comprises a reformer catalytic converter for catalytic partial oxidation.

* * * * *